(12) United States Patent
Masumoto

(10) Patent No.: US 8,648,264 B2
(45) Date of Patent: Feb. 11, 2014

(54) TERMINAL BOX

(75) Inventor: Yutaka Masumoto, Yao (JP)

(73) Assignee: Hosiden Corporation, Osaka (JP)

( * ) Notice: Subject to any disclaimer, the term of this patent is extended or adjusted under 35 U.S.C. 154(b) by 182 days.

(21) Appl. No.: 12/897,127

(22) Filed: Oct. 4, 2010

(65) Prior Publication Data

US 2011/0079413 A1 Apr. 7, 2011

(30) Foreign Application Priority Data

Oct. 5, 2009 (JP) ................................. 2009-231405

(51) Int. Cl.
*H05K 5/00* (2006.01)
(52) U.S. Cl.
USPC .............................. 174/520; 174/50; 220/281
(58) Field of Classification Search
USPC ........ 174/50, 58, 60, 520; 220/324, 326, 281, 220/284, 315, 783; 439/331, 731; 215/216; 292/80, 84
See application file for complete search history.

(56) References Cited

U.S. PATENT DOCUMENTS

| | | | | | |
|---|---|---|---|---|---|
| 4,212,415 | A | * | 7/1980 | Neely | 222/231 |
| 4,964,661 | A | * | 10/1990 | Cadwell et al. | 292/87 |
| 5,100,015 | A | * | 3/1992 | Vanderstuyf | 220/326 |
| 5,356,017 | A | * | 10/1994 | Rohr et al. | 215/216 |
| 5,551,589 | A | * | 9/1996 | Nakamura | 220/326 |
| 5,575,399 | A | * | 11/1996 | Intini | 220/835 |
| 5,577,779 | A | * | 11/1996 | Dangel | 292/80 |
| 5,871,113 | A | * | 2/1999 | Conway et al. | 220/210 |
| 5,931,514 | A | * | 8/1999 | Chung | 292/89 |
| 6,398,594 | B1 | * | 6/2002 | Bonilla et al. | 439/731 |
| 6,772,902 | B1 | * | 8/2004 | White | 220/283 |
| 7,413,479 | B1 | * | 8/2008 | Volpone | 439/692 |
| 7,553,180 | B2 | | 6/2009 | Hu et al. | |
| 7,563,985 | B2 | * | 7/2009 | Pini | 174/92 |
| 7,985,090 | B2 | * | 7/2011 | Hsu et al. | 439/331 |

FOREIGN PATENT DOCUMENTS

| | | |
|---|---|---|
| GB | 2282845 A | 4/1995 |
| JP | 61123576 U | 8/1986 |
| JP | 3014628 B2 | 3/1997 |
| JP | 2005044919 | 2/2005 |

* cited by examiner

*Primary Examiner* — Jinhee J Lee
*Assistant Examiner* — Dimary Lopez
(74) *Attorney, Agent, or Firm* — The Webb Law Firm

(57) ABSTRACT

A terminal box comprises a box casing 2 including terminal elements incorporated into the interior thereof; a lid element 4 for closing an opening of the box casing; and an engaging mechanism 7 for fixedly engaging an engaging element 5 provided in the lid element with an engaged element 6 provided in the box casing by pressing the lid element against the box casing. The engaging element includes a projecting piece 21 extending in a pressing direction of the lid member, and an engaging pawl 23 extending in a direction vertical to the extending direction of the projecting piece and provided in part of the projecting piece other than a distal end portion 22 of the projecting piece. The engaged element has a receiving hole 24 opening toward an outer side of the box casing and allowing the distal end portion of the projecting piece to be exposed to the outside when engaged with the engaging pawl.

4 Claims, 5 Drawing Sheets

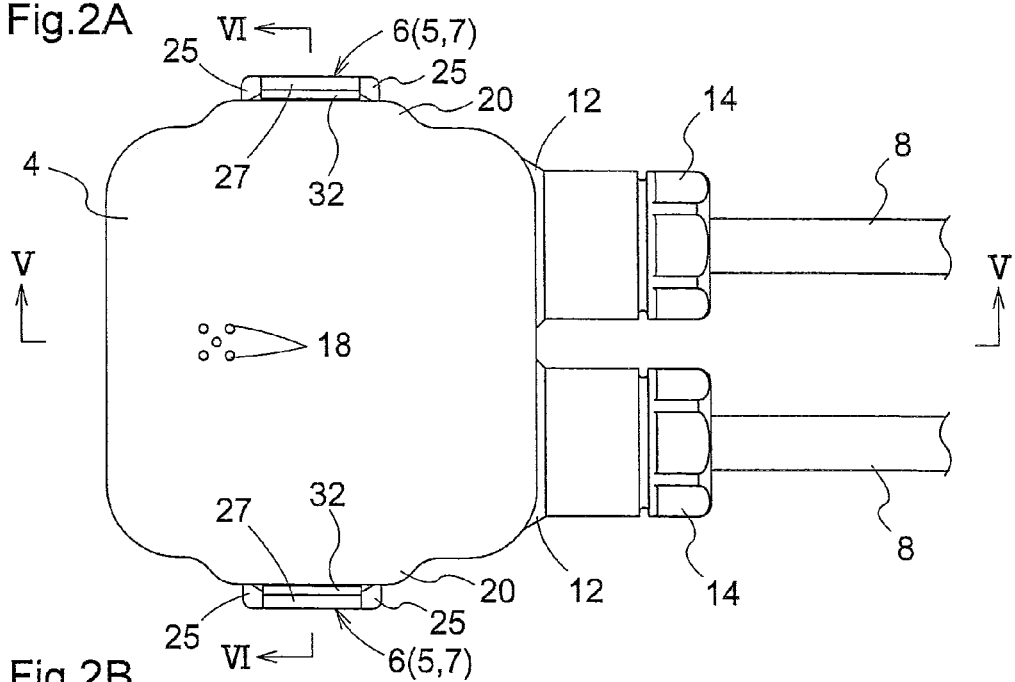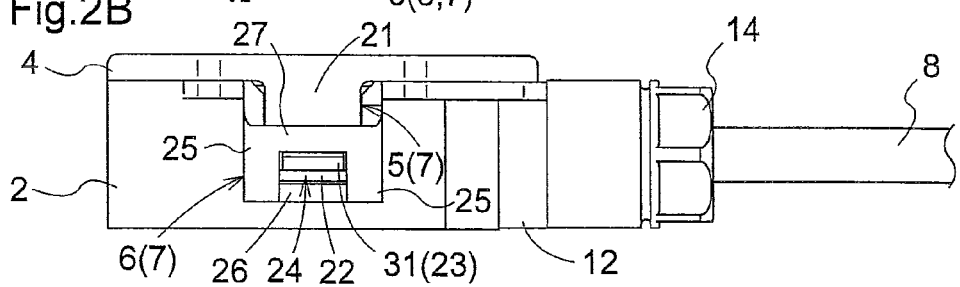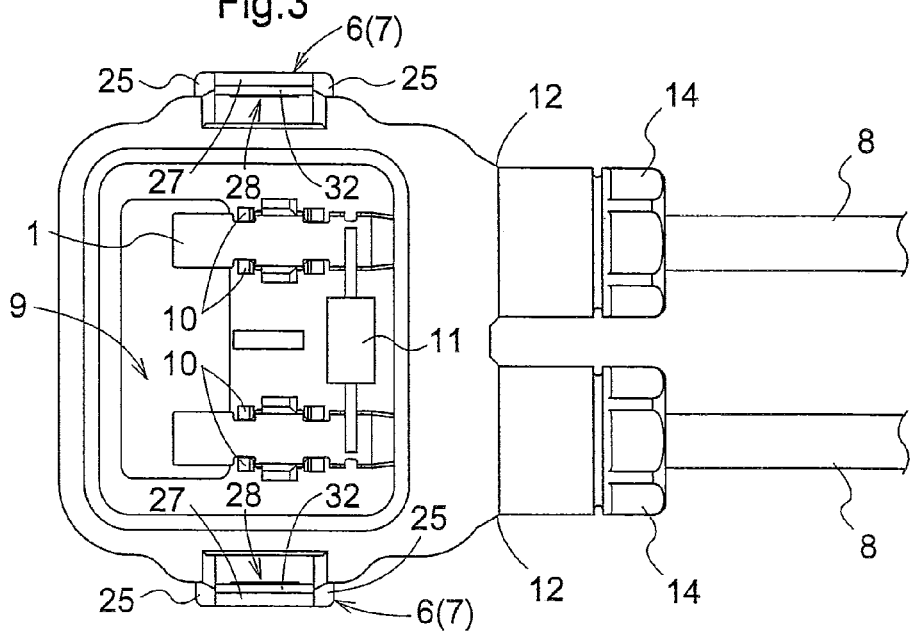

TERMINAL BOX

BACKGROUND OF THE INVENTION

1. Field of the Invention

The present invention relates to a terminal box comprising: a box casing including terminal elements incorporated into the interior thereof; a lid element for closing an opening of the box casing; and an engaging mechanism for fixedly engaging an engaging element provided in the lid element with an engaged element provided in the box casing by pressing the lid element against the box casing.

2. Description of the Related Art

An example of the terminal box as noted above is a terminal box for a solar cell module disclosed in Japanese Patent No. 3014628. This terminal box comprises an engaging element provided in a lid member including a projecting piece extending in a direction of pressing the lid member, and an engaging opening formed in the projecting piece. On the other hand, an engaged element is provided in a box casing and includes a convex surface projecting from an outer surface of the box casing to allow the engaged element to fit into the engaging opening.

In fixedly engaging the engaging element with the engaged element in order to fix the lid member to the box casing, the lid member is pressed against the box casing to move the projecting piece with the projecting piece being elastically deformed so that a distal end portion of the projecting piece rides on the convex surface. Then, the projecting piece is restorably deformed as the distal end portion of the projecting piece is disengaged from the convex surface, thereby allowing the convex surface to fit into the engaging opening.

On the other hand, in releasing the fixed engagement between the engaging element and the engaged element in order to remove the lid member from the box casing, a control member is hooked between the distal end portion of the projecting piece and the box casing to deform the projecting piece toward the direction away from the box casing so that the convex surface is disengaged from the engaging opening (see Japanese Patent No. 3014628, paragraph 0029; FIG. 12).

According to the device disclosed in Japanese Patent No. 3014628, it is not possible to move the lid member in the direction opposite from its pressing direction only by disengaging the engaging element form the engaged element.

Thus, when the projecting piece is deformed within an elastic limit for releasing the engagement, a further operation is required for moving the lid member in the direction opposite from its pressing direction to prevent the engaging element and the engaged element from being engaged with each other again by the restorable deformation of the projecting piece when the control member is removed. In this way, the conventional art has a drawback that the operations become complicated in removing the lid member from the box casing.

In addition, if the projecting piece is deformed beyond the elastic limit for disengaging the engaging element from the engaged element in order to prevent the engaging element and the engaged element from being engaged with other again by the restorable deformation of the projecting piece when the control member is removed, the projecting piece is plastically deformed. Thus, the conventional art has a further drawback that the lid member removed from the box casing is not reusable.

The present invention has been made having regard to the above-noted drawbacks, and its object is to provide a terminal box capable of simplifying the operations of removing the lid member from the box casing.

SUMMARY OF THE INVENTION

A first characteristic feature of the present invention lies in a terminal box comprising:
a box casing including terminal elements incorporated into the interior thereof;
a lid element for closing an opening of the box casing; and
an engaging mechanism for fixedly engaging an engaging element provided in the lid element with an engaged element provided in the box casing by pressing the lid element against the box casing;
wherein the engaging element includes a projecting piece extending in a pressing direction of the lid member, and an engaging pawl extending in a direction vertical to the extending direction of the projecting piece and provided in part of the projecting piece other than a distal end portion of the projecting piece, and
wherein the engaged element has a receiving hole opening toward an outer side of the box casing and allowing the distal end portion of the projecting piece to be exposed to the outside when engaged with the engaging pawl.

With this arrangement, the engaging element includes the projecting piece extending in the pressing direction of the lid member, and the engaging pawl extending in the direction vertical to the extending direction of the projecting piece and provided in part of the projecting piece other than the distal end portion of the projecting piece, while the engaged element has the receiving hole opening toward the outer side of the box casing and allowing the distal end portion of the projecting piece to be exposed to the outside when engaged with the engaging pawl. Thus, the terminal box with this arrangement allows the distal end portion of the projecting piece to be pressed toward the disengagement side and moved toward the direction opposite from the pressing direction of the lid member with the control member inserted into the receiving hole from the outer side of the box casing. More particularly, the operation of disengaging the engaging element from the engaged element and the operation of moving the lid member in the direction opposite from its pressing direction can be performed with continuous operations using a single control member. This simplifies the operations for removing the lid member from the box casing.

A second characteristic feature of the present invention lies in that the projecting piece has a bottom surface at the distal end portion thereof opposed to a wall surface portion of an inner wall surface of the receiving hole positioned adjacent a downward side of the projecting piece in the pressing direction.

With this arrangement, a flat control member is inserted between the wall surface portion of the receiving hole positioned adjacent the downward side of the projection piece in the pressing direction and the bottom surface provided in the distal end portion of the projecting piece to press the distal end portion of the projecting piece toward the disengagement side. Then, the flat control member is rotated with the wall surface being served as a reaction force receiver, thereby moving the projecting piece in the direction opposite from the direction of pressing the lid element.

A third characteristic feature of the present invention lies in that the terminal box further comprises a restricting portion for restricting displacement of the projecting piece to a predetermined position when the engaging pawl or the distal end portion of the projecting piece is depressed through the receiving hole in disengaging the engaging pawl from the receiving hole.

This arrangement can restrict displacement of the projecting piece caused when the distal end portion of the projecting piece is pressed, and reduce the possibility that the projecting piece is deformed. Thus, the lid member removed from the box casing is adequately reusable. Preferably, the restricting portion is provided in the box casing.

The fourth characteristic feature of the present invention lies in that the engaging pawl has a projecting height smaller than a depth-wise width of an inner wall surface of the receiving hole.

With this arrangement, the engaging pawl does not project outward of the inner wall surface of the receiving hole. Thus, it is prevented that the engaging pawl is caught by any other element and inadvertently disengaged from the receiving hole.

BRIEF DESCRIPTION OF THE DRAWINGS

FIG. 2A is a top plan view of the terminal box;

FIG. 2B is a side view of the terminal box;

FIG. 3 is a top plan view showing the interior of the box casing;

DETAILED DESCRIPTION OF THE PREFERRED EMBODIMENT

An embodiment of the present invention will be described hereinafter in reference to the accompanying drawings.

Figure 1A:
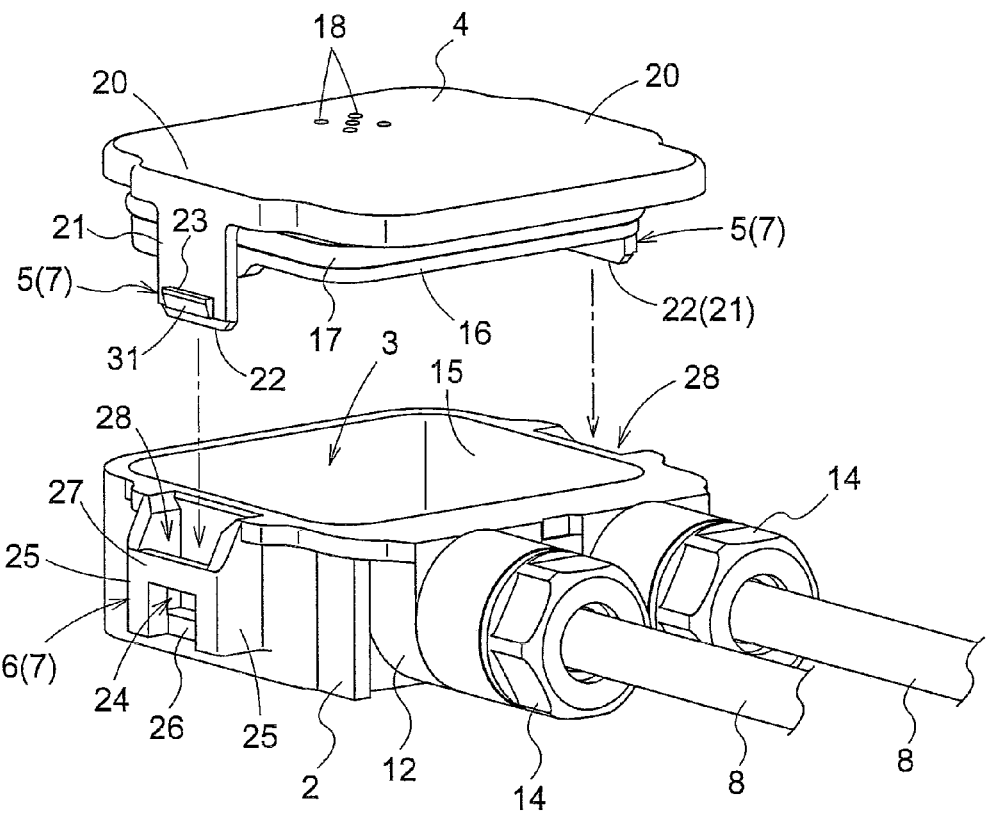
FIG. 1A is an exploded perspective view of a terminal box.
Figure 1B:
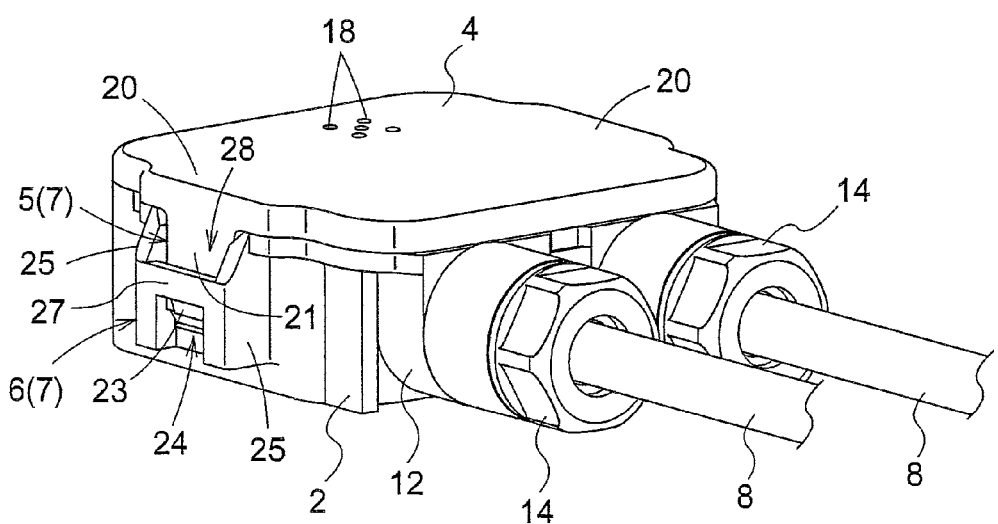
FIG. 1B is a perspective view of the terminal box including a lid element fixedly engaged with a box casing.

FIGS. 1 and 2 show a terminal box for a solar cell module in accordance with the present invention. The terminal box comprises a box casing 2 made of resin including a pair of metal terminal elements 1 (see FIG. 3) incorporated into the interior of the casing, a lid element 4 made of resin for closing an opening 3 of the box casing 2, and an engaging mechanism 7 for fixedly engaging an engaging element 5 provided in the lid element 4 with an engaged element 6 provided in the box casing 2 by pressing the lid element 4 against the box casing 2.

As shown in FIG. 3, the box casing 2 receives a pair of output cables 8 connected to a capacitor, for example, and connects them to the terminal elements 1, respectively. At a bottom of the box casing 2 is formed an input cable inlet 9 for receiving a pair of input cables (not shown) connected to the solar cell module so that the input cables are connected to the terminal elements 1, respectively.

The terminal elements 1 are fixed through terminal fixing clicks 10 integrally formed with an inner bottom portion of the box casing 2. The terminal elements 1 are connected to each other through a reverse-current short-circuit diode 11.

Figure 4:
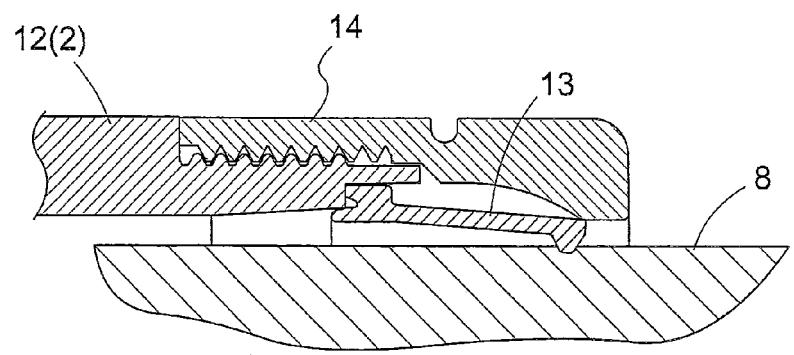
FIG. 4 is sectional view of a primary portion showing a construction for attaching an output cable.

As shown in FIG. 4, the output cables 8 are inserted into tubular members 12 integrally formed with the box casing 2 and connected to the terminal elements 1.

A gap between each tubular member 12 and each output cable 8 is closed by a cable packing 13 attached to an inner side of the tubular member 12 to prevent entry of water. The cable packing 13 is fastened to the output cables 8 through a cap 14 screwed to the tubular member 12.

Figure 5:
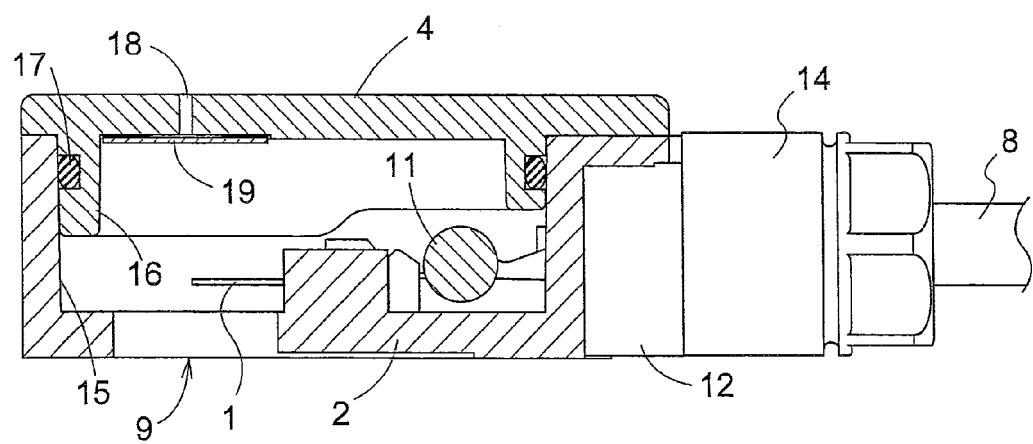
FIG. 5 is a sectional view taken on line V-V of FIG. 2A.

As shown in FIG. 5, the lid element 4 has a fitting tubular element 16 integrally formed with an inner side thereof and being fitted into an inner periphery 15 of the opening of the box casing 2. A rubber O-ring 17 acting as a waterproof seal element is fitted into a circumferential groove formed in an outer periphery of the fitting tubular element 16 at an interface between the outer periphery of the fitting tubular element 16 and the opening inner periphery 15.

The lid element 4 has a plurality of vents 18 formed therein. As shown in FIG. 5, a waterproof sheet 19 for covering the vents 18 is affixed to an inner surface of the lid element 4 through an adhesive to prevent water from entering from the vents 18.

As shown in FIGS. 1 and 2, the engaging mechanism 7 includes a pair of the engaging elements 5 made of resin, and integrally formed with and symmetrically provided in an outer peripheral portion of the lid element 4 to oppose with each other, and a pair of engaged elements 6 made of resin, and integrally formed with and symmetrically provided in an outer peripheral portion of the box casing 2 to oppose with each other.

Each of the engaging elements 5 has a plate-like projecting piece 21 extending in a pressing direction of the lid element 4 along an extension 20 extending from a side edge portion of the lid element 4, and an engaging pawl 23 extending in a direction vertical to the extending direction of the projecting piece 21 and provided in part of the projecting piece 21 other than a distal end portion 22 of the projecting piece 21.

Each of the engaged elements 6 has a receiving hole 24 that opens toward an outer side of the box casing 2 and allows the distal end portion 22 of the projecting piece 21 to be exposed to the outside when engaged with the engaging pawl 23.

More particularly, each engaged element 6 has a pair of vertical ribs 25 extending along the pressing direction, a connecting rib 26 provided in an outer surface of the box casing 2 for connecting the pair of vertical ribs 25 at distal end portions thereof in the pressing direction, and an intermediate plate-like beam element 27 spaced apart from the outer surface of the box casing 2 for connecting of the vertical ribs 25 at intermediate portions thereof.

The above arrangement provides an inserting hole 28, to which the projecting piece 21 is inserted until the engaging pawl 23 comes out of the insert hole. The inserting hole 28 is formed between the intermediate plate-like beam element 27 and the outer surface of the box casing 2 to form the receiving hole 24 surrounded by the pair of vertical ribs 25, connecting rib 26 and intermediate plate-like beam element 27. The engaging pawl 23 coming out of the inserting hole 28 is engageable with the intermediate plate-like beam element 27.

A projecting height H (see FIG. 6A) of the engaging pawl 23 from the projecting piece 21 is smaller than a depth D (see FIG. 6B) of an inner wall portion of an inner wall surface of the receiving hole 24 formed by the intermediate plate-like beam element 27 engaged with the engaging pawl 23. This arrangement prevents a distal end of the engaging pawl 23 engaged with the intermediate plate-like beam element 27 from projecting outward of the intermediate plate-like beam element 27.

When the lid element 4 is pressed against the box casing 2 with the fitting tubular element 16 being fitted into the inner periphery 15 of the opening 3, the projecting pieces 21 of the pair of engaging elements 5 are substantially concurrently inserted into the inserting holes 28 of the pair of engaged elements 6, respectively.

A gap between the distal ends of the engaging pawls 23 in the opposite engaging elements 5 is larger than a gap between the intermediate plate-like beam elements 27 in the opposite engaged elements 6. This allows the respective projecting pieces 21 to be inserted into the receiving holes 28 together with the engaging pawls 23 by being elastically deformed toward the box casing 2.

The distal end portion 22 of the projecting piece 21 has a wall surface positioned adjacent a downward side of the inner wall surface of the receiving hole 24 in the direction of pressing the projecting piece 21. The wall surface acts as a bottom surface 29 opposed to a top surface of the connecting rib 26 (see FIG. 6) and is formed by the thickness of the distal end portion 22 of the projecting piece 21 that has a thickness smaller than the thickness of the top surface of the engaging pawl 23 of the projecting piece 21 measured from the outer surface of the lid element 4.

A restricting portion 30 is provided in the box casing 2 for restricting an amount of displacement of the projecting piece 21 within an elastic range when the engaging pawl 23 or the distal end portion 22 of the projecting piece 21 is depressed through the receiving hole 24 in disengaging the engaging pawl 23 from the receiving hole 24. In the current embodiment, the restricting portion 30 is formed by an outer surface portion of the box casing 2 facing the receiving hole 24.

At a forward portion of the engaging pawl 23 in the inserting direction toward the receiving hole 24 is formed a contacting surface 31 (see FIG. 6) that inclines closer to the projecting piece 21 adjacent the forward portion thereof in the inserting direction. On the other hand, the intermediate plate-like beam element 27 has a guide surface 32 (see FIG. 6), to which the contacting surface 31 is pressed. The guide surface 32 inclines closer to the box casing 2 adjacent the forward portion thereof in the inserting direction (adjacent the bottom of the box casing 2).

A process for fixedly engaging the lid element 4 with the box casing 2 through the engaging mechanism 7 is described hereinafter in reference to FIG. 6.

Figure 6A:
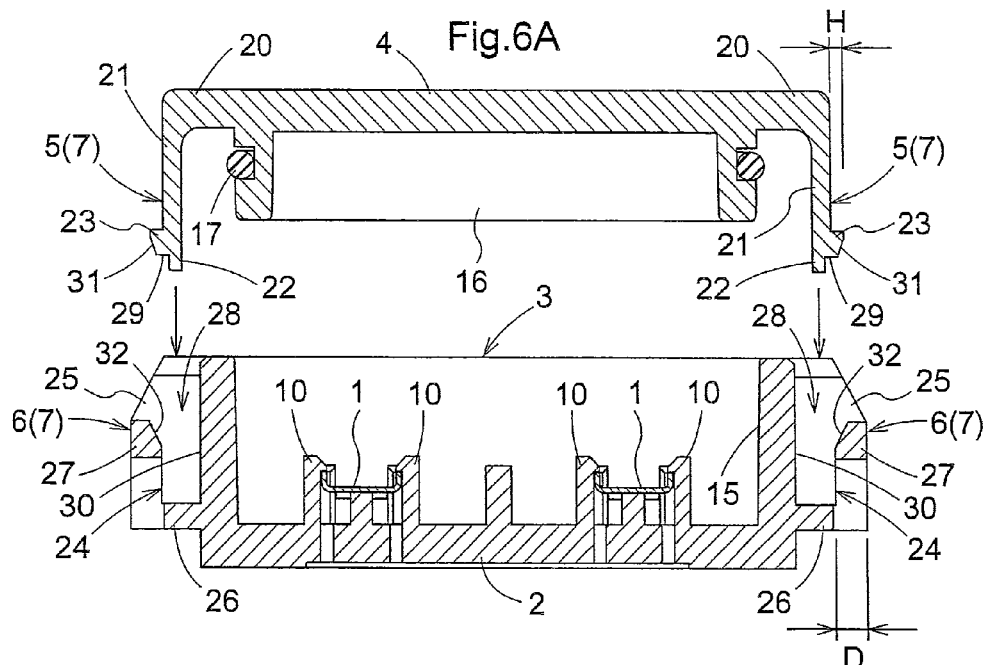
FIG. 6A is a sectional view taken on line VI-VI of FIG. 2A for explaining a process of engaging and fixing the lid element.

As shown in FIG. 6A, the lid element 4 having the O-ring 17 attached to the circumferential groove of the fitting tubular element 16 is pressed against the box casing 2 with the lid element 4 being faced with the box casing 2 so that the opposite projecting pieces 21 face the opposite receiving holes 28, respectively.

Figure 6B:
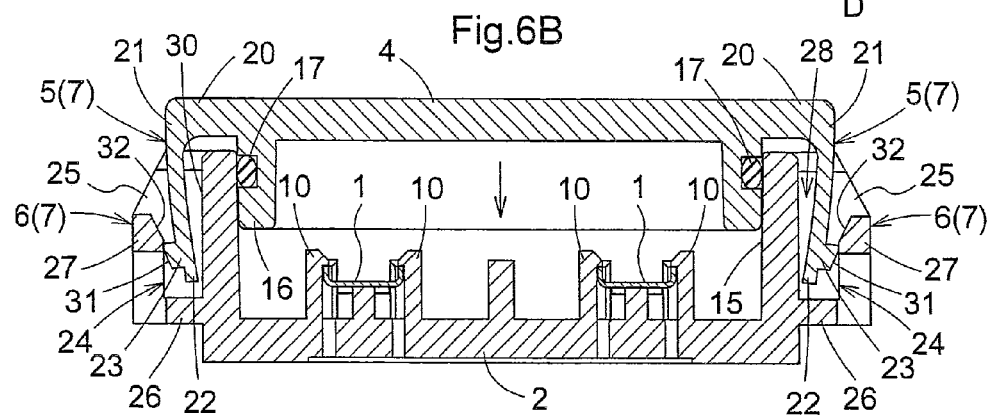
FIG. 6B is another sectional view taken on line VI-VI of FIG. 2A for explaining a process of engaging and fixing the lid element.
Figure 6C:
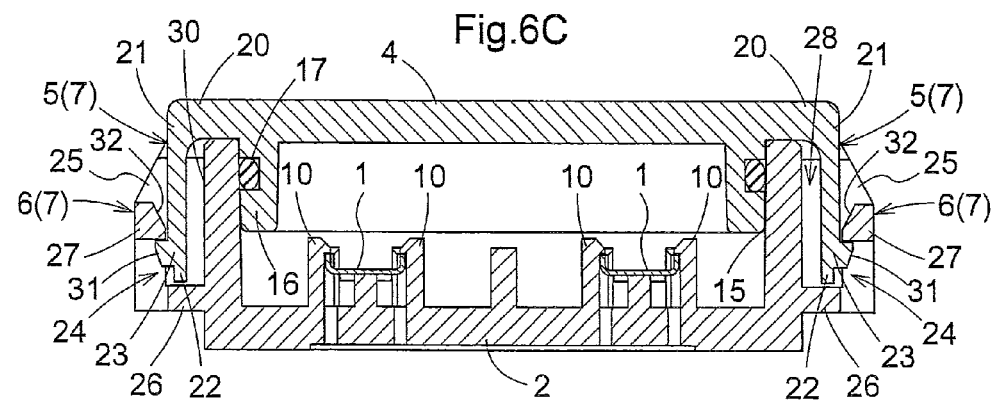
FIG. 6C is a further sectional view taken on line VI-VI of FIG. 2A for explaining a process of engaging and fixing the lid element.

In this state, as shown in FIG. 6B, the contact surfaces 31 of the opposite engaging pawls 23 are pressed against the guide surfaces 32 of the intermediate plate-like beam elements 27. This allows the opposite projecting pieces 21 to be elastically deformed toward the box casing 2 and inserted into the receiving holes 28 together with the engaging pawls 23.

When the engaging pawls 23 come out through the receiving holes 28, each projecting piece 21 is restorably deformed and each engaging pawl 23 is fixedly engaged with a corner of the intermediate plate-like beam element 27 at the forward portion thereof in the pressing direction. This allows the lid element 4 to be rigidly fixedly engaged with the box casing 2.

A process of removing the lid element 4 fixedly engaged with the box casing 2 is described hereinafter in reference to FIG. 7.

Figure 7A:
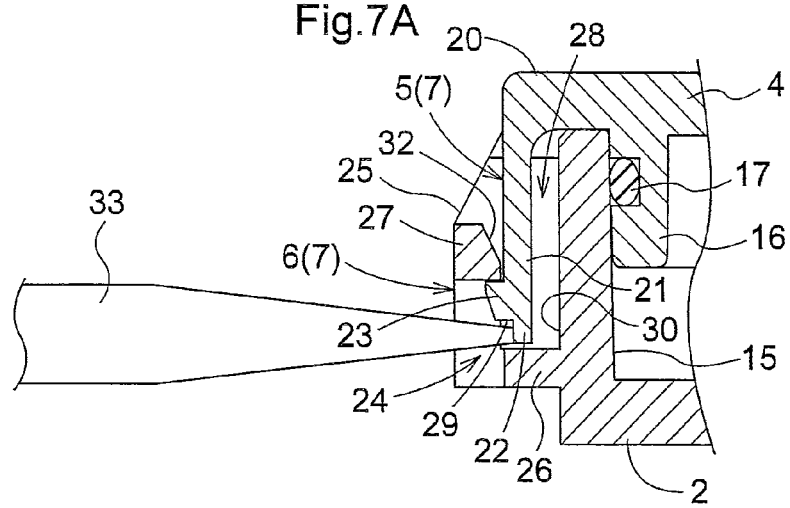
FIG. 7A is a sectional view of a primary portion for explaining a process of removing the lid element.

As shown in FIG. 7A, a flat distal end of a control rod (control element) 33 is inserted between the bottom surface 29 of the projecting piece 21 and the top surface of the connecting rib 26 through the receiving hole 24. A standard screwdriver, for example, may be used as the control rod 33.

Figure 7B:
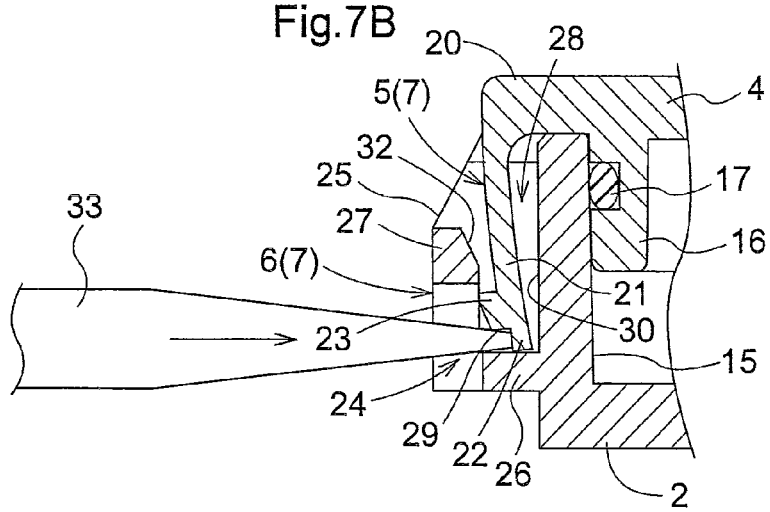
FIG. 7B is another sectional view of a primary portion for explaining a process of removing the lid element.

Next, as shown in FIG. 7B, the distal end portion 22 of the projecting piece 21 is pressed toward a disengaging direction, that is, toward the box casing 2 with the distal end of the control rod 33 thereby elastically deforming the projecting piece 21 so that the projecting piece 21 fits into the receiving hole 28 together with the engaging pawl 23.

Figure 7C:
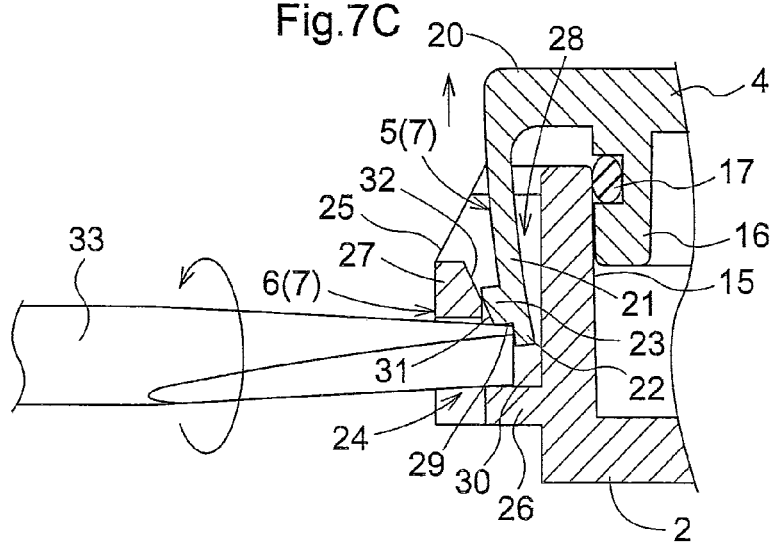
FIG. 7C is a further sectional view of a primary portion for explaining a process of removing the lid element.

Then, as shown in FIG. 7C, the control rod 33 is rotated with the connecting rib 26 being served as a reaction force receiver, thereby moving the projecting piece 21 in a direction opposite from the direction of pressing the lid element 4, that is, in a direction of inserting the projecting piece 21 into the receiving hole 28 along with the engaging pawl 23. As a result, the lid element 4 is raised from the box casing 2.

A series of operations shown in FIGS. 7A to 7C may be performed at the opposite engaging elements 5, separately or together, thereby removing the lid element 4 from the box casing 2.

What is claimed is:

1. A terminal box comprising:
    a box casing including terminal elements incorporated into the interior thereof;
    a lid element for closing an opening of the box casing; and
    an engaging mechanism for fixedly engaging an engaging element provided in the lid element with an engaged element provided in the box casing by pressing the lid element against the box casing;
    wherein the engaging element includes a projecting piece extending in a pressing direction of the lid member, and an engaging pawl provided in part of the projecting piece on a downstream side in the pressing direction of the projecting piece excluding a downstream side distal end portion of the projecting piece, the engaging pawl extending outward and in a direction vertical to an extending direction of the projecting piece, and
    wherein the engaged element has a receiving hole opening toward an outer side of the box casing and allowing the distal end portion of the projecting piece, to be exposed to the outside when engaged with the engaging pawl,
    wherein the distal end portion of the projecting piece is formed as a pressed portion that is pressed toward the box casing to release the engaging mechanism,
    wherein the engaged element has a pair of vertical ribs extending along the pressing direction, a connecting rib provided in an outer surface of the box casing for connecting the pair of vertical ribs at distal end portions thereof in the pressing direction, and an intermediate plate-like beam element spaced apart from the outer surface of the box casing for connecting of the vertical ribs at intermediate portions thereof, and
    wherein the projecting piece has a bottom surface at the distal end portion thereof opposed to a wall surface portion of an inner wall surface of the receiving hole positioned adjacent a downward side of the projecting piece in the pressing direction.

2. The terminal box as claimed in claim 1, further comprising a restricting displacement of the projecting piece to a predetermined position when the engaging pawl or the distal end portion of the projecting piece is depressed through the receiving hole in disengaging the engaging pawl from the receiving hole.

3. The terminal box as claimed in claim 2, wherein the restricting portion is provided in the box casing.

4. The terminal box as claimed in claim 1, wherein the engaging pawl has a projecting height smaller than a depthwise width of the inner wall surface of the receiving hole.

* * * * *